United States Patent
Amante et al.

(10) Patent No.: US 8,919,694 B2
(45) Date of Patent: Dec. 30, 2014

(54) SKID LANDING GEAR SYSTEM

(75) Inventors: William A. Amante, Grapevine, TX (US); Douglas H. Hamelwright, Jr., Bedford, TX (US); Franklin J. Holik, Mansfield, TX (US); Dale W. Springer, Weatherford, TX (US); William D. Dennison, II, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 19 days.

(21) Appl. No.: 13/700,020

(22) PCT Filed: Aug. 2, 2011

(86) PCT No.: PCT/US2011/046217
§ 371 (c)(1),
(2), (4) Date: Nov. 26, 2012

(87) PCT Pub. No.: WO2013/019213
PCT Pub. Date: Feb. 7, 2013

(65) Prior Publication Data
US 2013/0112810 A1 May 9, 2013

(51) Int. Cl.
*B64C 25/52* (2006.01)
*B64C 25/32* (2006.01)

(52) U.S. Cl.
CPC ........... *B64C 25/52* (2013.01); *B64C 2025/325* (2013.01)
USPC ...................................................... 244/108

(58) Field of Classification Search
USPC ............................................ 244/108, 100 R
See application file for complete search history.

(56) References Cited

U.S. PATENT DOCUMENTS

| 2,641,423 | A | * | 6/1953 | Bassett et al. | ............. 244/100 R |
| 3,173,632 | A | | 3/1965 | Woods | |
| 5,211,359 | A | * | 5/1993 | Rene et al. | ..................... 244/108 |
| 5,860,621 | A | | 1/1999 | Barquet et al. | |
| 6,244,538 | B1 | * | 6/2001 | Howard et al. | ............. 244/17.17 |
| 6,427,942 | B2 | | 8/2002 | Howard et al. | |
| 7,637,459 | B2 | | 12/2009 | Mast et al. | |
| 2002/0008175 | A1 | * | 1/2002 | Howard et al. | ............. 244/17.17 |
| 2008/0028720 | A1 | | 2/2008 | Bartlett et al. | |

FOREIGN PATENT DOCUMENTS

| DE | 272512 | C | 12/1912 |
| GB | 930794 | A | 7/1963 |
| GB | 1537366 | A | 12/1978 |

OTHER PUBLICATIONS

International Search Report and the Written Opinion of the International Searching Authority mailed by ISA/USA, U.S. Patent and Trademark Office on Jan. 10, 2012 for International Patent Application No. PCT/US11/46217.
Extended European Search Report dated Jun. 20, 2014 from counterpart EP App. No. 11870398.2.

* cited by examiner

*Primary Examiner* — Philip J Bonzell
(74) *Attorney, Agent, or Firm* — James E. Walton; Richard G. Eldredge

(57) ABSTRACT

A skid landing gear assembly is provided. One embodiment of the landing gear assembly may include a first and a second skid member, and a forward and an aft cross member. The forward and aft cross-members may have integrated attachment members coupled to a forward portion and an aft portion of the first and second skid members. In more particular embodiments, the cross-members may be beam members with open cross-sections, and the skid members may be beam members with a closed cross-section.

10 Claims, 8 Drawing Sheets

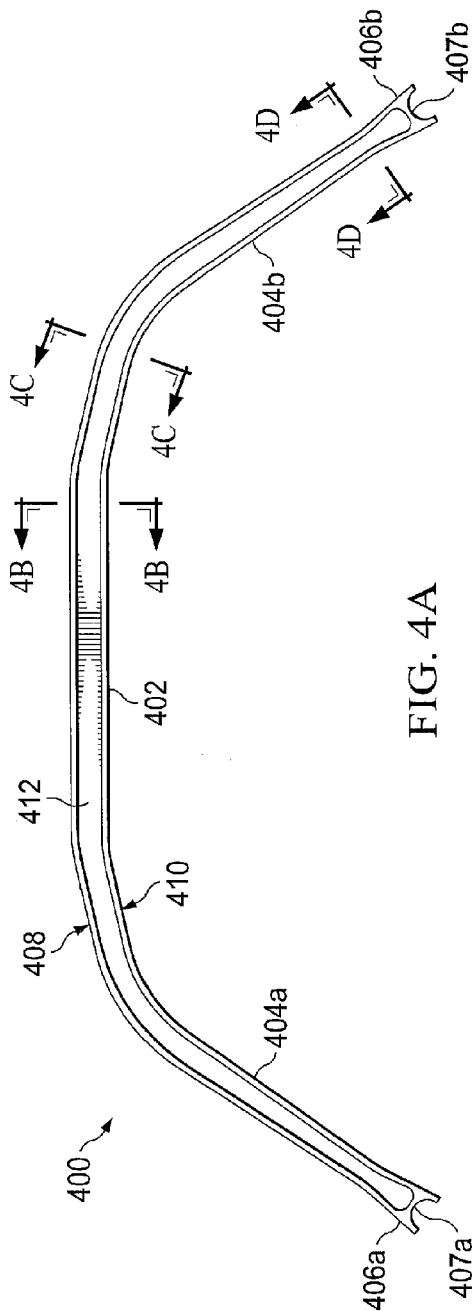
FIG. 4A
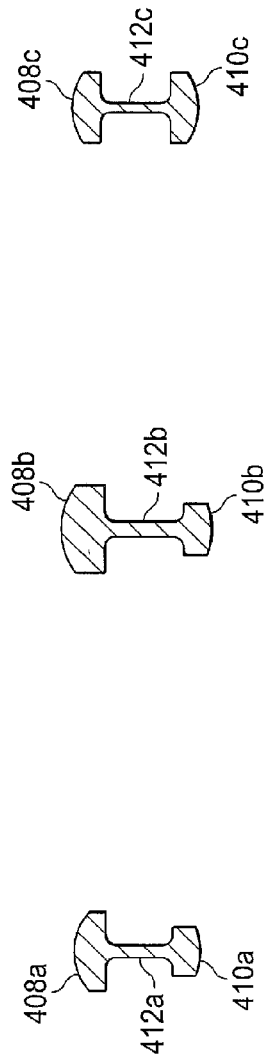
FIG. 4B
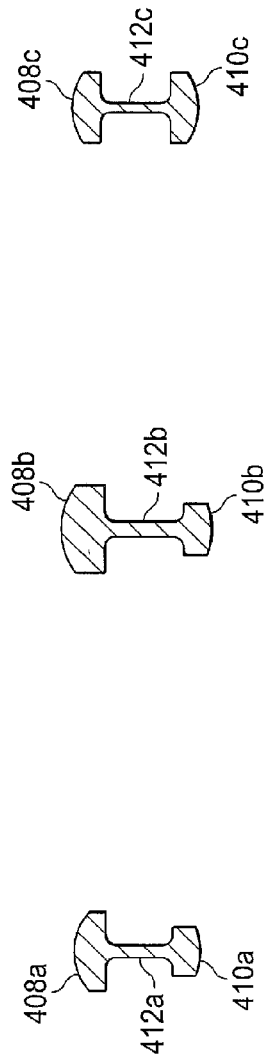
FIG. 4C
FIG. 4D

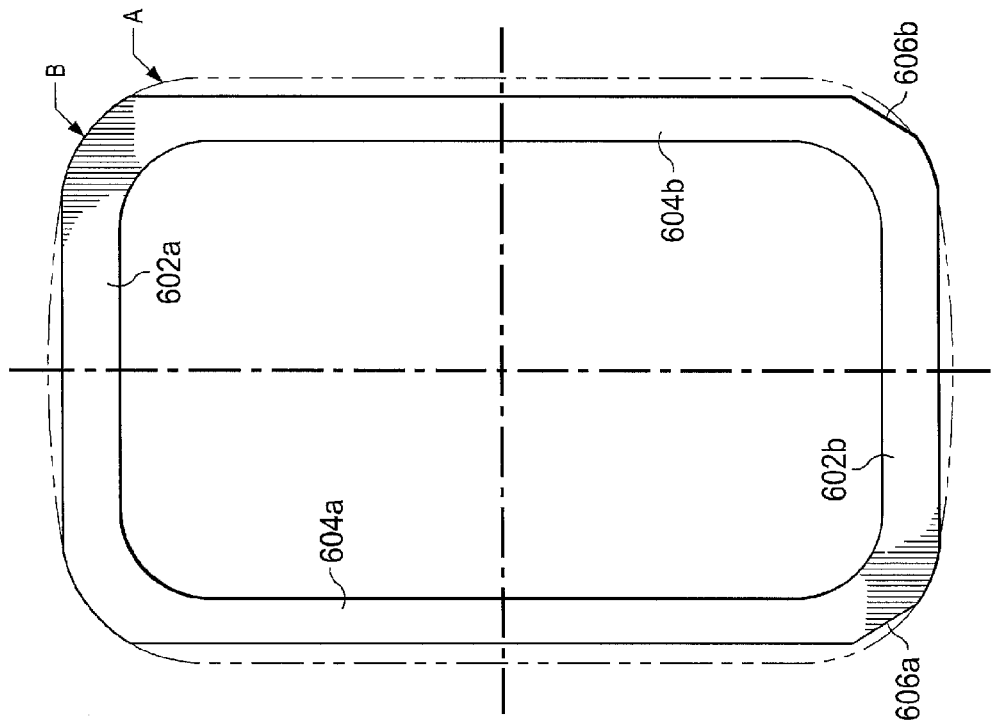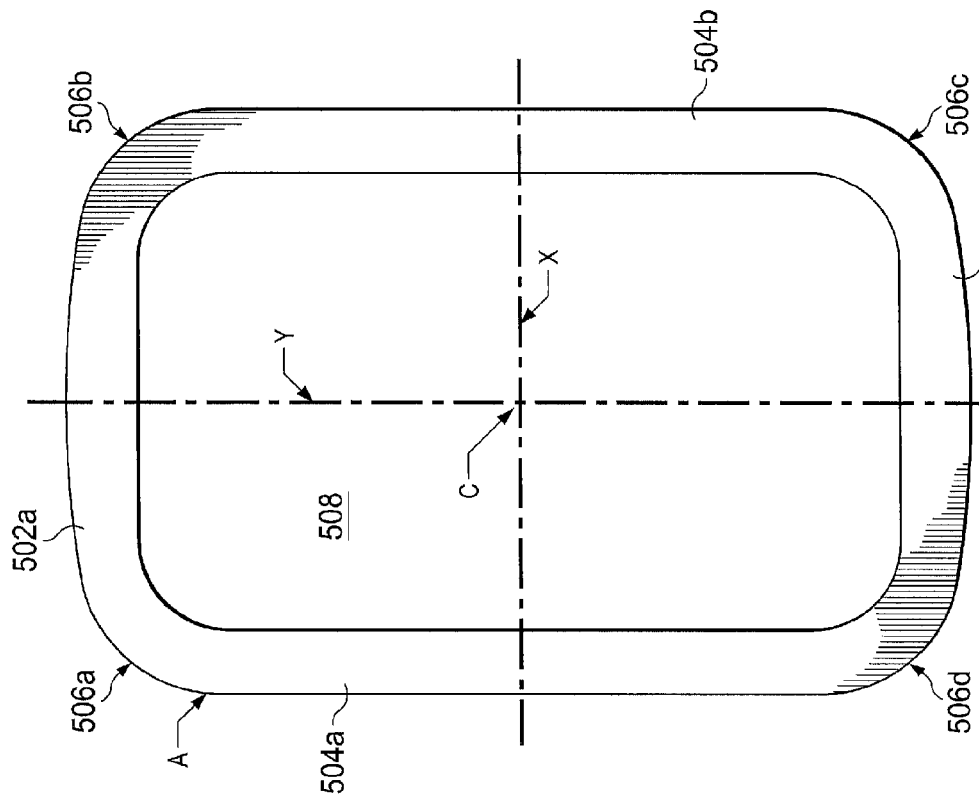

SKID LANDING GEAR SYSTEM

TECHNICAL FIELD

This disclosure relates in general to the field of heavier-than-air aircraft, and more particularly to a damage resistant skid landing gear system.

DESCRIPTION OF THE PRIOR ART

Many modern aircraft, helicopters in particular, feature a skid landing gear. A skid landing gear provides energy attenuation in all types of landings, including normal landings, hard landings, auto-rotations, and crash landings, and generally must be dynamically tuned to avoid ground resonance in the roll and shuffle modes.

A conventional skid landing gear typically has a pair of cross-tubes attached to a pair of skid tubes with four saddles. Skid tubes typically have a circular cross-section made from aluminum extrusions or seamless drawn aluminum tubes, and are also typically chemically milled to reduce thickness and weight where possible. However, chemical milling may present environmental complications and require a long lead time for manufacturing. Such tubes are also susceptible to damage when landing on unimproved surfaces or debris. A conventional saddle is a machined aluminum part or a machined forging that connects skid tubes to cross-tubes. Generally, a socket joint with bolts is used because of the high structural loads on the landing gear in vertical or run-on landing. Consequently, saddles can substantially affect the cost of manufacturing, aerodynamic drag, weight, number of parts, and assembly time of an aircraft.

For aircraft in the field, inspection and maintenance of cross tubes may be difficult or impossible because of limited access to the inside of the tube. The tube and saddle may have to be removed to insert a scope into the tube for inspection. Moreover, even if inspection reveals damage or corrosion, it may be impossible to repair because of the limited access.

Thus, the design of a cost-effective, environmentally sensitive, and lightweight landing gear that requires less manufacturing time has presented significant challenges to engineers and manufacturers.

BRIEF DESCRIPTION OF THE DRAWINGS

The features believed characteristic and novel of the landing gear system described herein are set forth in the appended claims. However, the system, as well as a preferred mode of use, and further objectives and advantages thereof, will best be understood by reference to the following detailed description when read in conjunction with the accompanying drawings, wherein:

FIG. 4A is a front view of an embodiment of a cross member according to this specification;

FIGS. 4B-D are cross-sectional views of the cross member;

FIG. 5 is a cross-sectional view of an example embodiment of a skid according to this specification;

FIG. 6 is a cross-sectional view of another embodiment of a skid according to this specification;

While the system is susceptible to various modifications and alternative forms, novel features thereof are shown and described below through specific example embodiments. It should be understood, however, that the description herein of specific example embodiments is not intended to limit the system or apparatus to the particular forms disclosed, but on the contrary, the intention is to cover all modifications, equivalents, and alternatives falling within the spirit and scope of the appended claims.

DESCRIPTION OF THE PREFERRED EMBODIMENT

Illustrative embodiments of the novel system are described below. In the interest of clarity, not all features of such embodiments may be described. It should be appreciated that in the development of any such system, numerous implementation-specific decisions can be made to achieve specific goals, such as compliance with system-related and business-related constraints, which will vary from one implementation to another. Moreover, it should be appreciated that such decisions might be complex and time-consuming, but would nevertheless be a routine undertaking for those of ordinary skill in the art having the benefit of this disclosure.

Reference may be made to the spatial relationships between various components and to the spatial orientation of various aspects of components as the system is depicted in the attached drawings. In general, such references assume a frame of reference consistent with observing an aircraft at rest on flat, level ground, in steady level flight, or hover, as the context may dictate. However, as should be recognized by those skilled in the art, the elements, members, components, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the example embodiments described herein may be oriented in any desired direction.

Figure 1:
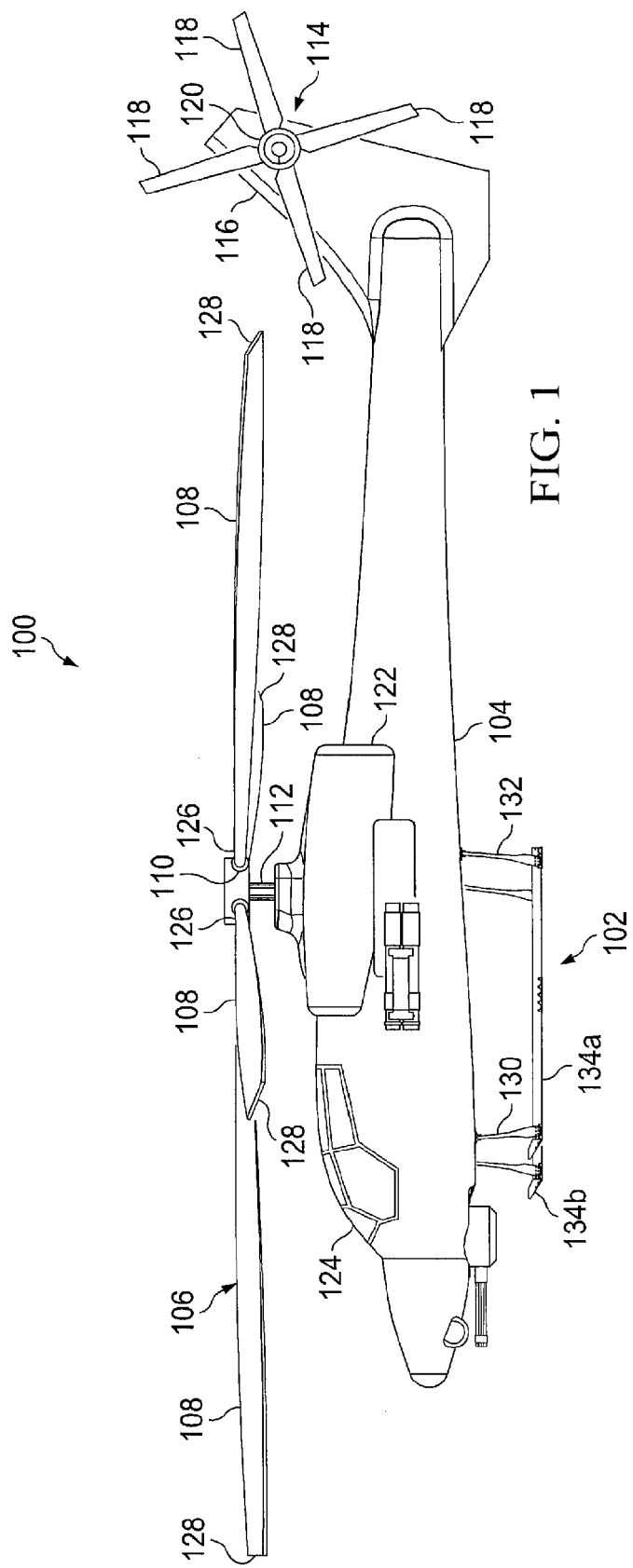
FIG. 1 is a perspective view of a helicopter having a landing gear assembly according to this specification.

Referring to FIG. 1 in the appended drawings, a helicopter 100 having a helicopter landing gear 102 according to this specification is illustrated. Helicopter 100 includes a fuselage 104 and a main rotor 106. Main rotor 106 includes a plurality of main rotor blades 108 that are coupled to one or more rotor yokes 110 and a drive mast 112. Torque imparted to fuselage 104 by main rotor 106 is counteracted by a tail rotor 114 carried by a tail portion 116 of fuselage 104. Tail rotor 114 includes a plurality of tail rotor blades 118 that are coupled to a tail rotor hub 120. Main rotor 106 and tail rotor 114 are powered by a drive means 122 under the control of a pilot in a cockpit 124. Each rotor blade 108 has an inboard root end 126 and an opposing outboard blade tip 128. The root end 126 of each rotor blade 108 is coupled to one of rotor yokes 110.

Landing gear 102 generally includes a forward cross member 130, an aft cross member 132, and longitudinal skid members 134a-b, providing energy attenuation through plastic deformation of cross members 130 and 132.

In certain embodiments, cross members 130 and 132 may be cross-beams with integral saddles that may be bolted on to a skid member. In more particular embodiments, such crossbeams may have an open cross section, such as an I-beam. An I-beam or other open cross-section can provide ready access for inspection and maintenance in the field, as well as reduce weight, part counts, and assembly time. Moreover, a crossbeam with an open cross-section substantially improves the manufacturing process by substantially reducing or eliminating the need to use chemical milling to reduce the thickness of walls and caps for dynamic tuning.

Skid members 134a-b may be skid beams with closed, rectangular cross-sections that are lighter, more weight efficient, stronger, and more damage resistant than round tubes for landing on unimproved or uneven surfaces. In particular, such skid beams may be an aluminum lithium alloy having upper and lower caps with more material away from the neutral axis than a tube, and two vertical walls that are closer to the neutral axis than a round tube, which can minimize the amount of material and weight while providing increased support for landing on unimproved or uneven surfaces. Moreover, the cross sections of such skid beams can make it economically feasible to machine wall thicknesses in lieu of chemical milling, hence reducing the environmental impact and time of production.

Figure 2:
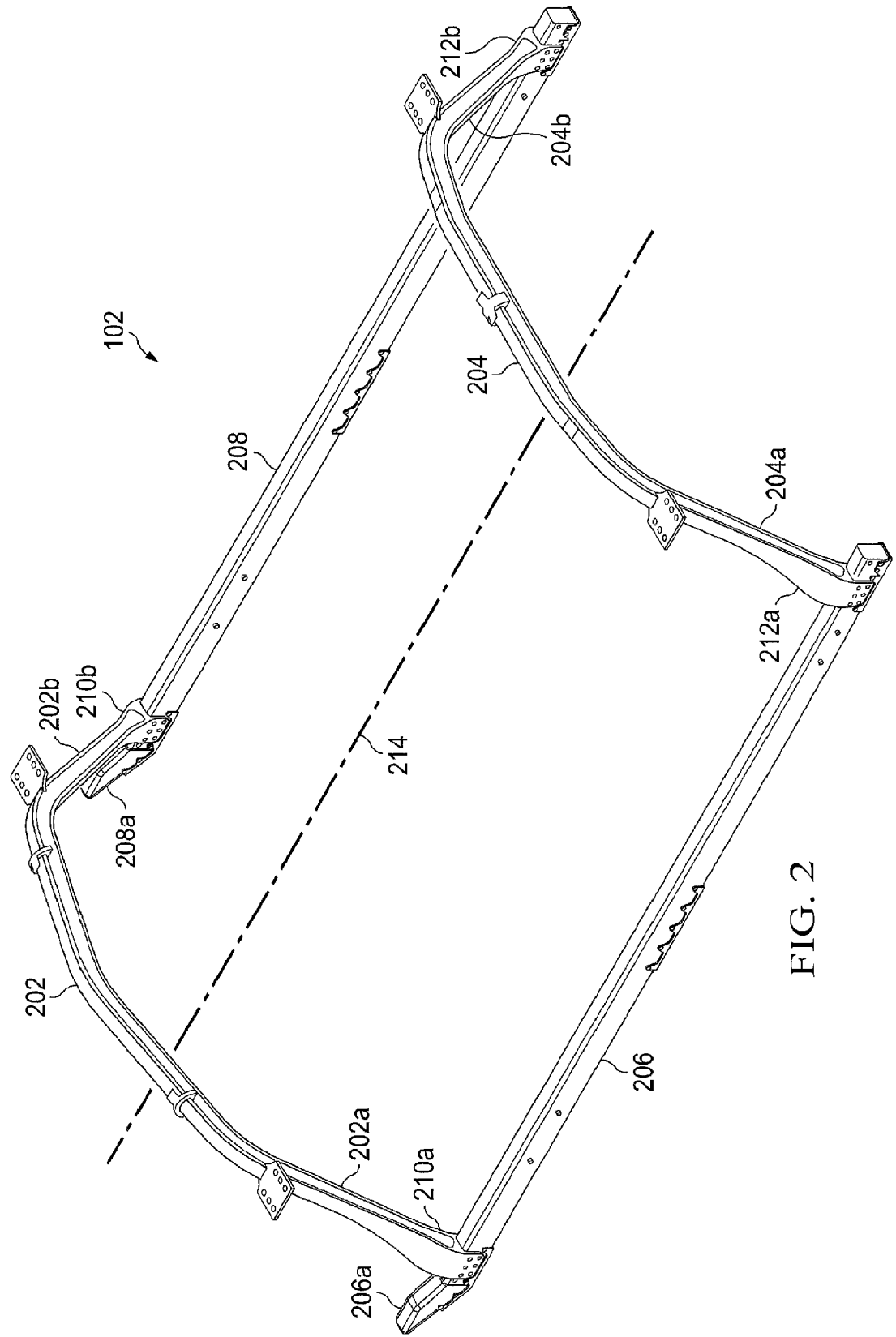
FIG. 2 is a perspective view of an example embodiment of the landing gear assembly.

FIG. 2 is a perspective view of an example embodiment of landing gear 102. Landing gear 102 generally includes a forward cross member 202 and an aft cross member 204. Cross members 202 and 204 may extend between a first skid 206 and a second skid 208. As shown in FIG. 2, cross members 202 and 204 may be generally characterized as U-shaped in certain embodiments. Forward cross member 202 may have a first forward leg 202a and a second forward leg 202b, which can be curved down and terminate at forward integrated attachment members 210a and 210b, respectively. Similarly, aft cross member may have a first aft leg 204a and a second aft leg 204b. Aft legs 204a-b may also be curved down and terminate at aft integrated attachment members 212a and 212b, respectively. Attachment member 210a couples first forward leg 202a to first skid 206, and attachment member 210b couples second forward leg to second skid 208. Likewise, attachment members 212a-b couple aft legs 204a-b to first skid 206 and second skid 208, respectively. Skid 206 and skid 208 are generally parallel to each other, and parallel to a longitudinal axis 214. Skid 206 and skid 208 may have up-turned forward ends 206a and 208a, respectively. Forward ends 206a and 208a may be integral to skids 206 and 208, but in certain embodiments, forward ends 206a and 208a are manufactured separately and inserted into skids 206 and 208 to eliminate bending processes in the manufacture of skids 206 and 208.

Figure 3:
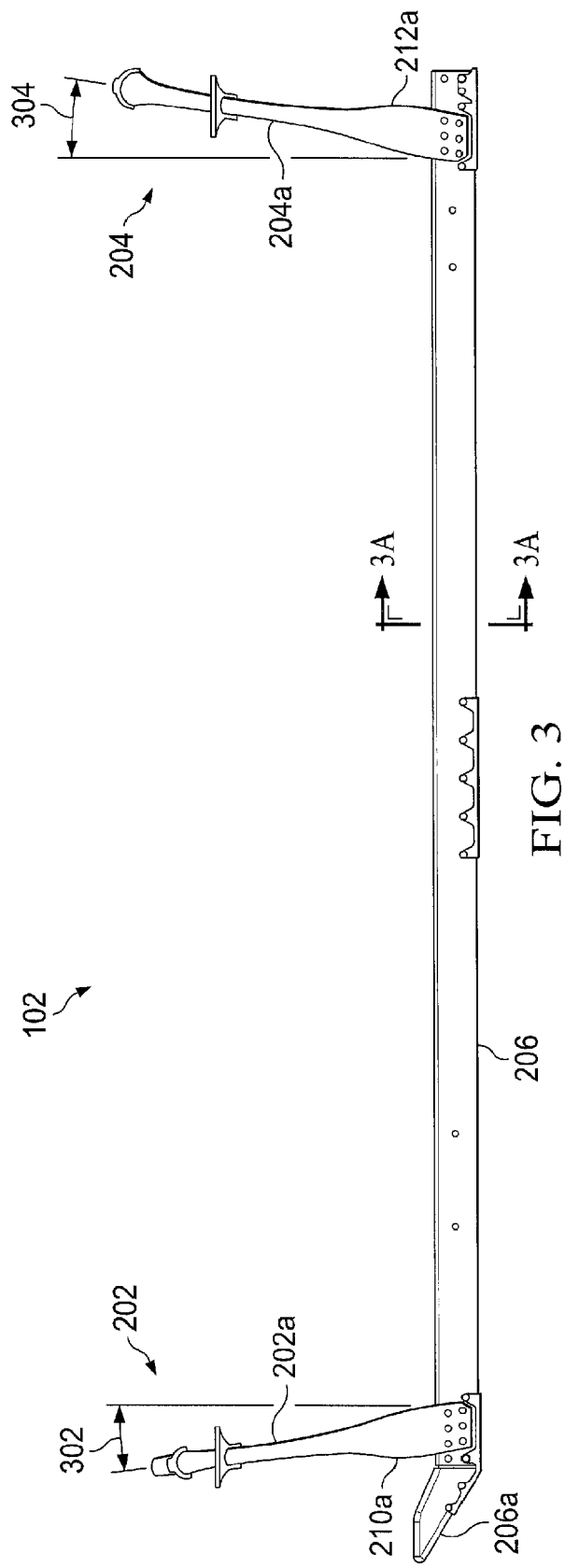
FIG. 3 is a side view of an example embodiment of the landing gear assembly.

FIG. 3 is a side view of an example embodiment of landing gear 102. Forward cross member 202 may have a first forward leg 202a terminating at forward integrated attachment member 210a. Similarly, aft cross member 204 may have a first aft leg 204a terminating at aft integrated attachment member 212a. Attachment member 210a couples first forward leg 202a to first skid 206 at a rake angle 302, and attachment member 212a couples aft leg 204a to first skid 206 at a rake angle 304. Although not visible in FIG. 3, attachment members 210b and 212b couple second forward leg 202b and second aft leg 204b to second skid 208 at substantially similar rake angles. The rake angles may be adjusted for dynamic tuning, but in certain embodiments, the rake angles are preferably +/−10 degrees. In more particular embodiments, rake angle 302 is forward 9 degrees, and rake angle 304 is aft 9 degrees. Forward end 206a may be coupled to skid 206, as shown in FIG. 3.

FIG. 4A is a front view an embodiment of a cross member 400 that may be used in certain embodiments of a landing gear system in accordance with this specification. Cross member 400 may include a central member 402, leg members 404a and 404b, and integrated attachment members 406a and 406b. Integrated attachment members 406a-b generally have skid interfaces 407a and 407b, respectively, that are preferably saddle or U-shaped in one embodiment. In other embodiments, however, skid interfaces 407a and 407b may be adapted to conform to any skid surface shape. In embodiment of FIG. 4A, central member 402 and leg members 404 have caps 408 and 410, and a web 412.

As illustrated in FIGS. 4B-D, caps 408a-c and 410a-c are generally rounded and symmetrical about a vertical axis. Web 412 is generally oriented lengthwise along the vertical axis, and is also symmetrical about the vertical axis. The cross-sections of central member 402 and leg members 404a-b may vary along the length of cross member 400 (as shown in 4B-D). More particularly, the thickness and width of caps 408a-c, 410a-c, and webs 412a-c may be tailored to tune out dynamic ground resonance issues, and thereby substantially eliminate or reduce the need for a rocker beam or pivot. Central member 402 and leg members 404 may have an open cross-section, such as an I-beam, for example. Such an open cross-section may be forged and machined, thus substantially eliminating the need for costly and time-consuming processes like tube bending and chemical milling. Relative to conventional tube designs, an open cross-section also reduces weight, number of parts, and assembly time, and greatly simplifies maintenance and inspection.

FIG. 5 is a cross-sectional view of first skid 206, taken along line D-D of FIG. 3. The exact cross-section of a particular embodiment may depend on specific design criteria that can vary widely, and the embodiment illustrated in FIG. 5 is merely representative of a basic extruded cross-section A that may be employed advantageously in skid 206. As shown, first skid 206 may have a closed beam cross-section A with caps 502a-b and webs 504a-b. Cross-section A is generally rectangular with rounded corners 506a-d and a hollow interior 508, and axes X-Y that intersect a centroid C. Webs 504a-b may have generally vertical walls in some embodiments, which may be closer together than a round tube to reduce aerodynamic drag in forward flight or hover, and to provide improved support for the lower surface that contacts the ground for landing on unimproved or uneven surfaces. Thus, in operation webs 504a-b may be generally aligned with landing loads. Webs 504a-b may also be flat walls, which may eliminate or substantially reduce problems that are often associated with chemical milling required for round tubes. Webs 504a-b are also generally longer and thinner than caps 502a-b. A cross-section such as cross-section A is also generally more weight efficient than round tubes, as caps 502a-b may have more material away from the neutral axis than a comparable tube cross-section. Caps 502a-b may be thicker than webs 504a-b to increase damage tolerance and reduce bending while minimizing weight of skid 206. In the area closer to the neutral axis, the vertical orientation of webs 504a-b may further reduce the amount of material (and thus weight) in that area.

FIG. 6 is a cross-sectional view of an alternative embodiment of first skid 206, taken along line 3A of FIG. 3. More particularly, the cross-section of FIG. 6 illustrates how a basic extruded cross-section, such as cross-section A of FIG. 5, may be further refined and customized to reduce the weight of a skid while maintaining improved support features. Thus, the embodiment of FIG. 6 includes cross-section A of FIG. 5 in phantom, and further includes a cross-section B that illustrates refinements to cross-section A in one embodiment of skid 206. Cross-section B maintains a generally rectangular cross-section, and webs 604*a-b* also remain as generally vertical walls. However, caps 602*a-b* may be flattened relative to caps 502*a-b*, and the thickness of webs 604*a-b* may be reduced relative to webs 504*a-b*. Other refinements may also be possible, such as flattening corners 606*a-b*, for example.

Figure 7:
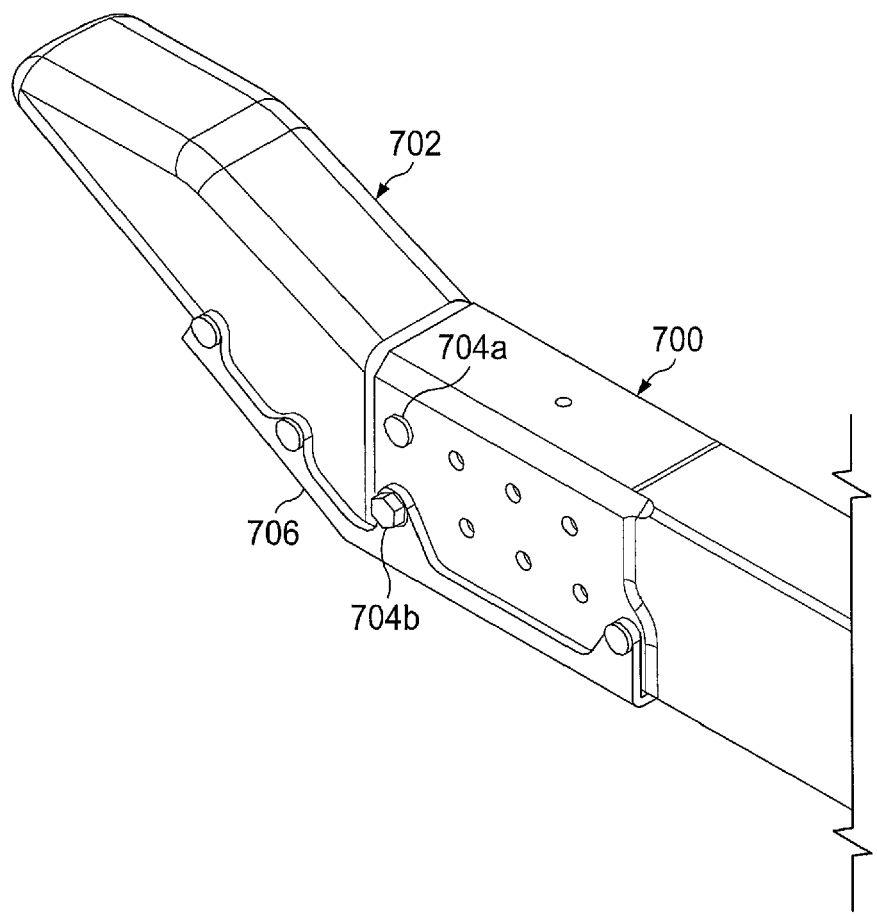
FIG. 7 is a partial perspective view of one embodiment of a skid coupled to a forward end insert according to this specification.

FIG. 7 is a partial perspective view of a skid 700 coupled to a forward end insert 702 in one embodiment of landing gear 102. Forward end insert 702 may be inserted into skid 700 and secured with fasteners 704*a-b*, which penetrate skid 700 and an interior portion of forward end insert 702 (not shown). Forward end insert 702 may be further coupled to skid 702 with a retention element 706, as shown in FIG. 7.

Figure 8:
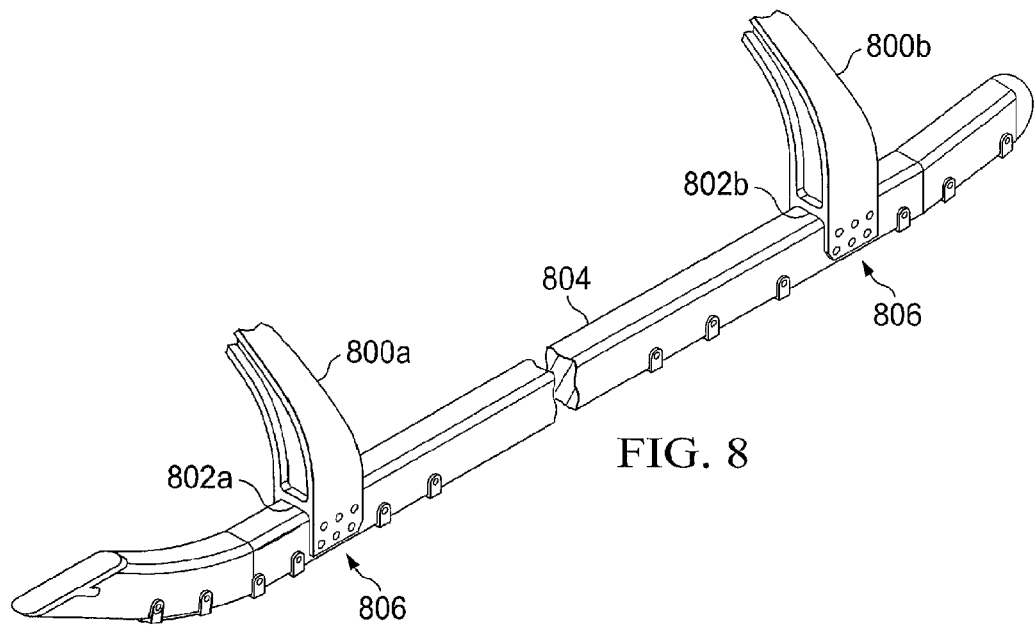
FIG. 8 is partial perspective view of additional details that may be associated with an embodiment of an integrated attachment member in accordance with this specification.

FIG. 8 is partial perspective view of additional details that may be associated with an embodiment of an integrated attachment member in accordance with this specification. Integrated attachment members 800*a-b* may have skid interfaces 802*a-b* that are generally saddle-shaped or U-shaped, and can be coupled to a skid 804 with fasteners 806. In certain embodiments, the size and orientation of webs (e.g., webs 504*a-b* in FIG. 5) may allow two rows of fasteners 806 to minimize the material stock size. Significantly, because integral attachment members 800*a-b* and skid 804 may be machined rather than chemically milled, holes may be predrilled in integrated attachment members 800*a-b* and skid 804, which substantially reduces or eliminates the need for cold worked holes and field-drilling to replace parts.

Figure 9:
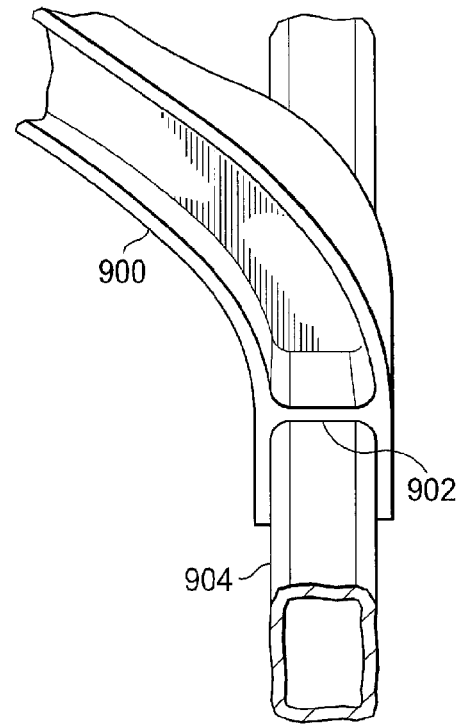
FIG. 9 is a partial front view of a particular embodiment of an integrated attachment member and skid beam in accordance with this specification.

FIG. 9 is a partial front view of a particular embodiment of an integrated attachment member and skid beam in accordance with this specification. In the embodiment of FIG. 9, integrated attachment member 900 may have a saddle-shaped skid interface 902 fitted over a skid member 904.

The system and apparatus described herein provides significant advantages, some of which have already been mentioned. For example, skid beams as described herein may be lighter, stronger, less susceptible to damage on unimproved ground, and produce lower aerodynamic drag in forward flight or hover than round skid tubes. Cross-beams of the type described herein having an open cross-section may also be lighter than conventional cross-tubes while also improving access for inspection and maintenance. Integral attachment members can further reduce aerodynamic drag, weight, part count, assembly time, and cost.

Figure 10:
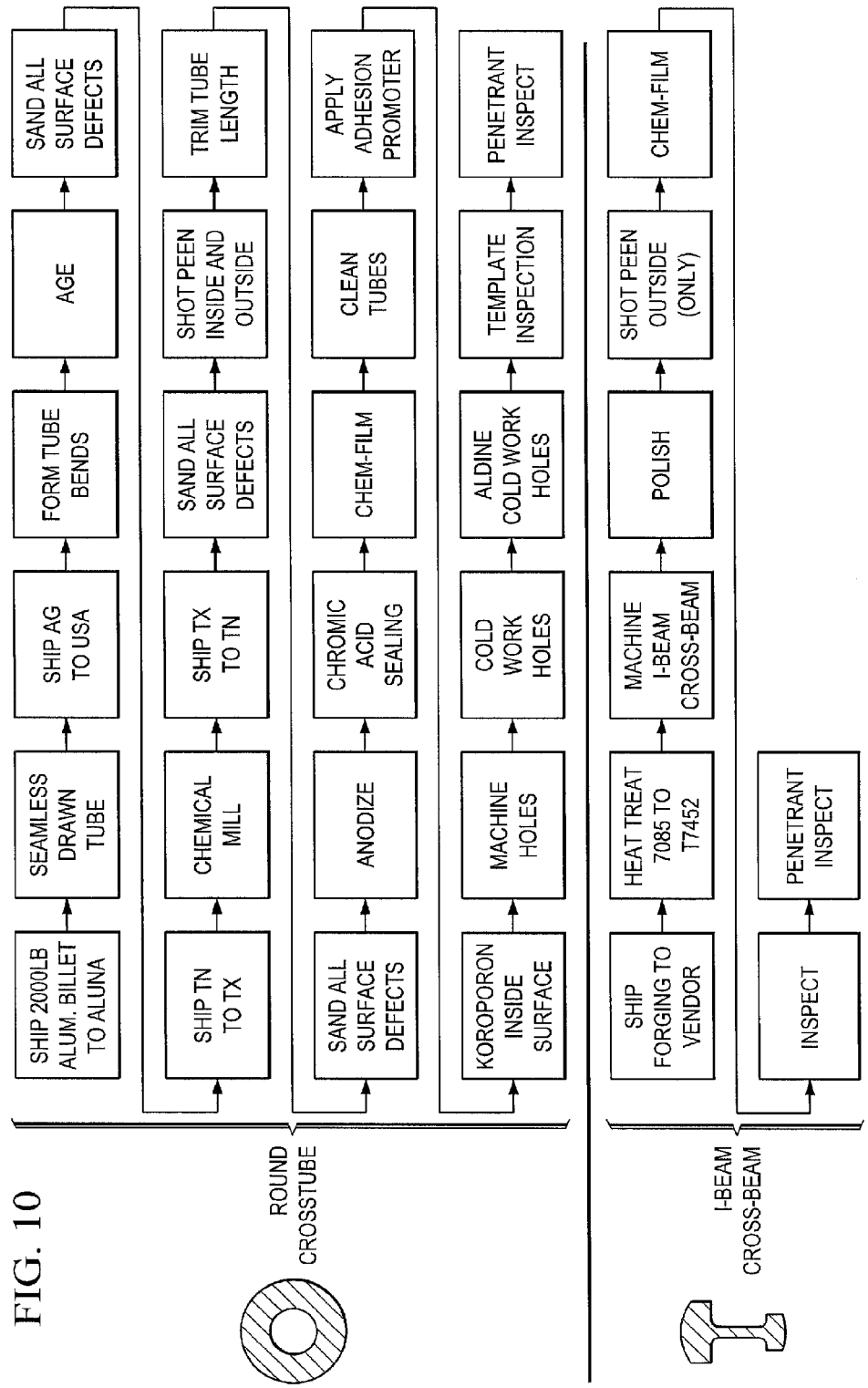
FIG. 10 is a simplified flow diagram comparing a process for manufacturing a cross member according to this specification.

Significantly, both skid beams and cross-beams with integral saddles can be manufactured with greener technologies than chemical milling, and a forward end insert eliminates bending processes for skids. FIG. 10 provides a simplified comparison between a conventional manufacturing process for cross-tubes and a manufacturing process that may be associated with one embodiment of a cross-beam in accordance with this specification. As illustrated, twenty-four discrete processes can be required to manufacture a conventional round cross-tube, but the number of discrete processes can be reduced to only eight in certain embodiments of a cross-beam manufactured according to this specification. A manufacturing process for embodiments of a skid beam in accordance with this specification can realize similar advantages.

Eliminating chemical milling provides many benefits. Cross-beams as described herein are generally much easier to dynamically tune than chemically milled tubes, for example. Improved dynamic tuning may, in turn, also substantially reduce or eliminate the need for a rocker beam or pivot for ground resonance. Moreover, a complete set of landing gear can be manufactured and assembled in much less time than a conventional landing gear that require chemical milling. Elimination of chemical milling and bending processes according to this specification may additionally increase the number of vendors available to produce components while also reducing the scrap rate, thereby increase competition and further reducing costs.

Certain example embodiments have been shown in the drawings and described above, but variations in these embodiments will be apparent to those skilled in the art. The principles disclosed herein are readily applicable to a variety of aircraft, including helicopters and unmanned aerial vehicles with skid landing gear. The preceding description is for illustration purposes only, and the claims below should not be construed as limited to the specific embodiments shown and described.

The invention claimed is:

1. A landing gear assembly, comprising:
a first skid member;
a second skid member;
a forward cross member having a first forward integrated attachment member coupled to a forward portion of the first skid member and a second forward integrated attachment member coupled to a forward portion of the second skid member;
an aft cross member having a first aft integrated attachment member coupled to an aft portion of the first skid and a second aft integrated attachment member coupled to an aft portion of the second skid member;
a first forward end insert configured to slidingly engage within the first skid member; and
a retention element securely attached to both the first skid member and the first forward end insert and configured to retain the first forward end insert to the first skid member;
wherein the first and second skid members are beam members having a substantially rectangular cross section with rounded corners;
wherein a beam of the beam members comprises opposing first and second caps and opposing first and second webs; and
wherein the beam has thickened portions along the first and second caps.

2. The landing gear assembly of claim 1, wherein the forward and aft cross members are beam members having an open cross-section.

3. The landing gear assembly of claim 1, further comprising:
a second forward end insert coupled to the forward end of the second skid member.

4. The landing skid of claim 1, wherein the first and second webs are aligned to receive vertical loads upon contact with a horizontal surface.

5. The landing skid of claim 1, wherein the elongated beam has pre-drilled holes adapted to receive bolts for coupling to a cross-member.

6. A cross-beam apparatus, comprising:
a central member portion having a first end and a second end;
a first integral leg portion adjacent to first end;
a second integral leg portion adjacent the second end;
a first integrated attachment portion adjacent to the first integral leg portion;
a second integrated attachment portion adjacent to the second integral leg portion;

a first forward end insert configured to slidingly engage within the first skid member; and a retention element securely attached to both the first skid member and the first forward end insert and configured to retain the first forward end insert to the first skid member;

wherein the first integrated attachment portion and the second integrated attachment portion have an attachment interface;

wherein the first and second skid members are beam members having a substantially rectangular cross section with rounded corners;

wherein a beam of the beam members comprises opposing first and second caps and opposing first and second webs; and wherein the beam has thickened portions along the first and second caps.

7. The cross-beam apparatus of claim 6, wherein the attachment interface is a saddle-shaped attachment interface.

8. The cross-beam apparatus of claim 6, wherein the first and second integrated attachment portions have pre-drilled holes to receive bolts for coupling to a skid member.

9. An aircraft, comprising:
a fuselage; and
a landing gear coupled to the fuselage, wherein the landing gear comprises:
a first skid member;
a second skid member;
a forward cross member having first forward integrated attachment member coupled to a forward portion of the first skid member and a second forward integrated attachment member coupled to a forward portion of the second skid member;
an aft cross member having a first aft integrated attachment member coupled to an aft portion of the first skid and a second aft integrated attachment member coupled to an aft portion of the second skid member:
a first forward end insert configured to slidingly engage within the first skid member; and
a retention element securely attached to both the first skid member and the first forward end insert and configured to retain the first forward end insert to the first skid member;
wherein the first and second skid members are beam members having a substantially rectangular cross section with rounded corners;
wherein a beam of the beam members comprises opposing first and second caps and opposing first and second webs; and
wherein the beam has thickened portions along the first and second caps.

10. The aircraft of claim 9, where the beam members have a hollow interior.

* * * * *